US012479208B2

(12) United States Patent
Ito

(10) Patent No.: US 12,479,208 B2
(45) Date of Patent: Nov. 25, 2025

(54) METHOD FOR CLEANING INKJET HEAD AND CLEANING DEVICE

(71) Applicant: Konica Minolta, Inc., Tokyo (JP)

(72) Inventor: Yohei Ito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 246 days.

(21) Appl. No.: 18/337,989

(22) Filed: Jun. 20, 2023

(65) Prior Publication Data

US 2024/0001680 A1 Jan. 4, 2024

(30) Foreign Application Priority Data

Jun. 30, 2022 (JP) ................................. 2022-106108

(51) Int. Cl.

*B41J 2/165* (2006.01)
*C09D 11/101* (2014.01)
*C09D 11/12* (2006.01)

(52) U.S. Cl.

CPC ......... *B41J 2/16552* (2013.01); *C09D 11/101* (2013.01); *C09D 11/12* (2013.01); *B41J 2002/16558* (2013.01)

(58) Field of Classification Search

CPC .................................................... B41J 2/16552
See application file for complete search history.

(56) References Cited

U.S. PATENT DOCUMENTS

2006/0017769 A1* 1/2006 Akiyama ............. C11D 3/2068
347/28

FOREIGN PATENT DOCUMENTS

| | | | | | |
|---|---|---|---|---|---|
| CN | 111234594 | A | * | 6/2020 | ........ B41J 21/16508 |
| JP | 2010260296 | A | | 11/2010 | |
| JP | 2011167672 | A | * | 9/2011 | |
| KR | 20090011482 | A | * | 2/2009 | |

* cited by examiner

*Primary Examiner* — Sharon Polk
(74) *Attorney, Agent, or Firm* — LUCAS & MERCANTI, LLP

(57) ABSTRACT

In a method for cleaning an inkjet head, the inkjet head is cleaned using a first cleaning liquid capable of maintaining a dispersion state of ink and a second cleaning liquid having a solvent different from the ink.

14 Claims, 9 Drawing Sheets

METHOD FOR CLEANING INKJET HEAD AND CLEANING DEVICE

The entire disclosure of Japanese patent Application No. 2022-106108, filed on Jun. 30, 2022, is incorporated herein by reference in its entirety.

BACKGROUND

Technological Field

The present disclosure relates to a method for cleaning an inkjet head and a cleaning device cleaning the inkjet head.

Description of the Related Art

In an inkjet head, it is known that discharge of ink becomes unstable due to thickening of the ink in an ink channel toward a discharge port, aggregation of pigment, or precipitation of a component in the ink.

Japanese Laid-Open Patent Publication No. 2010-260296 discloses that the inkjet head is cleaned using an organic solvent liquid containing water as a cleaning liquid in order to simultaneously perform the thickening or the aggregation of the ink and removal of a water-soluble precipitate (foreign matter).

However, in the method for cleaning the inkjet head using the cleaning liquid described in Japanese Laid-Open Patent Publication No. 2010-260296, because a solvent different from a solvent contained in the ink infiltrates into the inkjet head, the dispersion state of the ink collapses, and the pigment aggregates. The aggregate of the produced pigment grows by receiving force such as shearing force when passing through the channel, which may cause a discharge abnormality.

SUMMARY

The present disclosure has been made in view of the above problems, and an object of the present disclosure is to provide a cleaning method and a cleaning device for an inkjet head capable of removing the foreign matter while preventing generation of the aggregate.

To achieve at least one of the abovementioned objects, according to an aspect of the present invention, a method for cleaning an inkjet head reflecting one aspect of the present invention comprises: cleaning the inkjet head using a first cleaning liquid capable of maintaining a dispersion state of ink and a second cleaning liquid having a solvent different from the ink.

In the method for cleaning the inkjet head of the present disclosure, the first cleaning liquid may be made of a solvent identical to the ink.

The method for cleaning the inkjet head of the present disclosure may include: supplying the first cleaning liquid to a discharge surface of the inkjet head; and supplying the second cleaning liquid to the discharge surface after supplying the first cleaning liquid to the discharge surface.

The method for cleaning the inkjet head of the present disclosure may further include discharging the ink from the inkjet head after the supplying the second cleaning liquid to the discharge surface.

The method for cleaning the inkjet head of the present disclosure may further include removing the first cleaning liquid and/or the second cleaning liquid remaining on the discharge surface after the supplying the second cleaning liquid to the discharge surface.

In the method for cleaning the inkjet head of the present disclosure, ink containing wax may be used as the ink. In this case, the method for cleaning the inkjet head may further include gelling at least the ink located in a discharge port of the inkjet head before the supplying the first cleaning liquid to the discharge surface.

In the method for cleaning the inkjet head of the present disclosure, an ultraviolet curable ink may be used as the ink. In this case, it is preferable to use water as the second cleaning liquid.

To achieve at least one of the abovementioned objects, according to an aspect of the present invention, a cleaning device reflecting one aspect of the present invention is a cleaning device that cleans an inkjet head, and the cleaning device comprises a cleaning portion that cleans the discharge surface of the inkjet head using a first cleaning liquid capable of maintaining a dispersion state of the ink and a second cleaning liquid having a solvent different from the ink.

In the cleaning device of the present disclosure, the cleaning portion may include a web that moves while abutting on a discharge surface of the inkjet head, a first supply portion that supplies the first cleaning liquid to the web, and a second supply portion that supplies the second cleaning liquid to the web. In this case, the first supply portion and the second supply portion preferably alternately supply the first cleaning liquid and the second cleaning liquid.

In the cleaning device of the present disclosure, the cleaning portion may include a first cleaning portion that cleans the discharge surface of the inkjet head using the first cleaning liquid and a second cleaning portion that cleans the discharge surface using the second cleaning liquid.

In the cleaning device of the present disclosure, the first cleaning portion and the second cleaning portion are preferably any one of a web type cleaning unit, a roller type cleaning unit, and a nozzle type cleaning unit. In this case, the web type cleaning unit preferably includes a web that moves while being in contact with the discharge surface and a first supply portion that supplies the first cleaning liquid to the web. Preferably, the roller type cleaning unit includes a roller to which the first cleaning liquid is supplied and which moves while being in contact with the discharge surface. Preferably the nozzle-type cleaning unit includes a nozzle portion that injects the second cleaning liquid toward the discharge surface and a blade that moves while being in contact with the discharge surface and scrapes off the second cleaning liquid adhering to the discharge surface.

In the cleaning device of the present disclosure, the first cleaning portion may be any one of the web type cleaning unit and the roller type cleaning unit, and the second cleaning portion may be the nozzle type cleaning unit.

In the cleaning device of the present disclosure, a supply amount of the first cleaning liquid supplied to a discharge surface of the inkjet head may be larger than a supply amount of the second cleaning liquid supplied to the discharge surface.

In the cleaning device of the present disclosure, a plurality of the inkjet heads may be provided for each color. In this case, the cleaning portion may be switchable between a first cleaning mode in which the inkjet head is cleaned using the first cleaning liquid and the second cleaning liquid and a second cleaning mode in which the inkjet head is cleaned using only the first cleaning liquid. Furthermore, in this case, any one of the plurality of inkjet heads may be cleaned using only the first cleaning liquid.

The foregoing and other objects, features, aspects and advantages of the present invention will become more apparent from the following detailed description of the present invention when taken in conjunction with the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
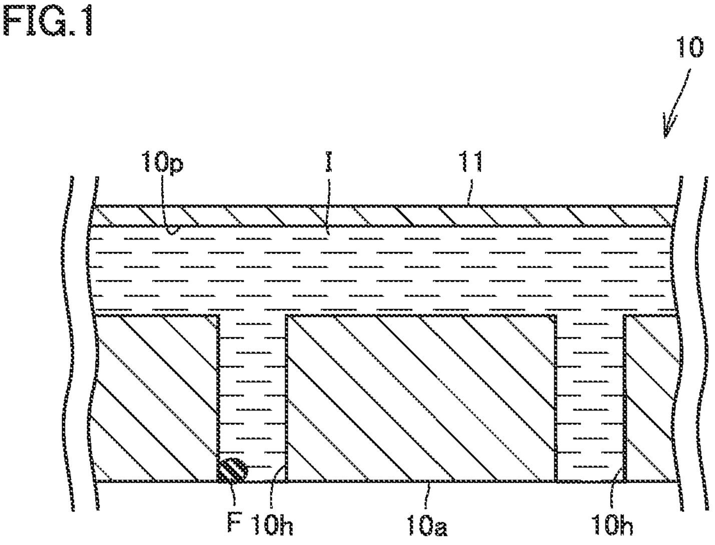
FIG. 1 is a view illustrating a state in which a foreign matter exists in a discharge port of an inkjet head according to a first embodiment.

Hereinafter, one or more embodiments of the present invention will be described with reference to the drawings. However, the scope of the invention is not limited to the disclosed embodiments.

With reference to the drawings, embodiments of the present disclosure will be described in detail below. In the following embodiments, the same or common portions are denoted by the same reference numeral in the drawings, and the description will not be repeated.

First Embodiment

FIG. 1 is a view illustrating a state in which a foreign matter exists in a discharge port of an inkjet head according to a first embodiment.

As illustrated in FIG. 1, an inkjet head 10 includes a main body 11. A discharge port 10*h* and a flow channel 10*p* communicating with discharge port 10*h* are provided in main body 11. Inkjet head 10 includes a discharge surface 10*a* in which discharge port 10*h* is provided.

In inkjet head 10, a foreign matter F may precipitate on or adhere to discharge port 10*h*. In the first embodiment, a cleaning method and a cleaning device of inkjet head 10 will be described by exemplifying a case where foreign matter F is a water-soluble precipitate precipitated from ink I.

Figure 2:
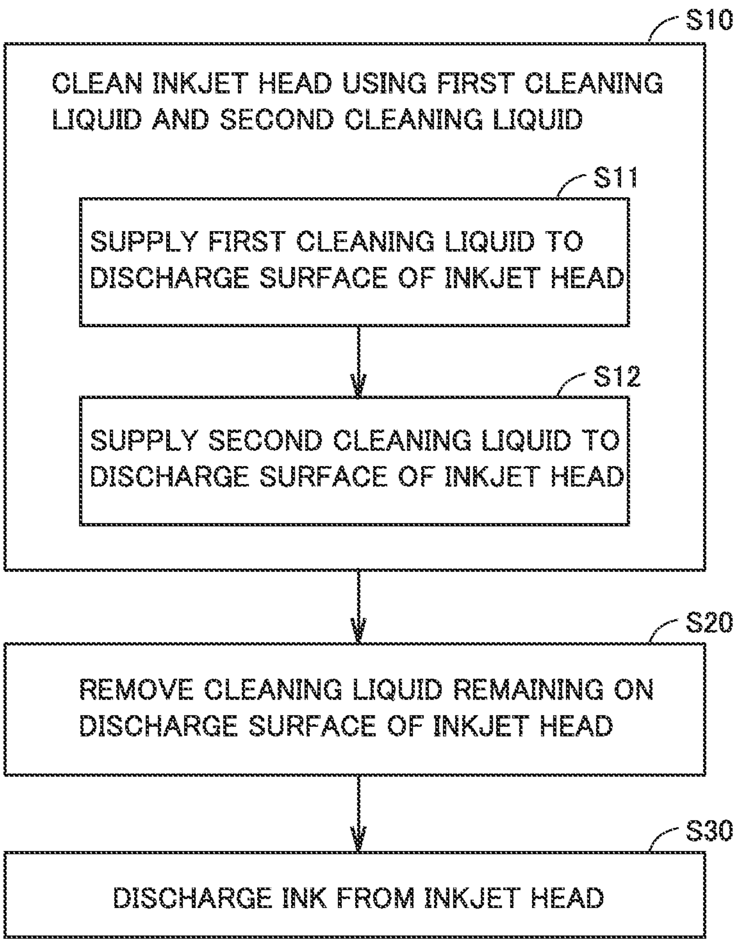
FIG. 2 is a flowchart illustrating a flow of a method for cleaning the inkjet head of the first embodiment.

FIG. 2 is a flowchart illustrating a flow of a method for cleaning the inkjet head of the first embodiment.

As illustrated in FIG. 2, the method for cleaning inkjet head 10 of the first embodiment includes a process (S10) of cleaning the inkjet head using a first cleaning liquid and a second cleaning liquid, a process (S20) of removing the cleaning liquid remaining on the discharge surface of the inkjet head, and a process (S30) of discharging the ink from the inkjet head.

In process (S10), inkjet head 10 is cleaned using the cleaning device. The cleaning device includes a cleaning portion that cleans inkjet head 10 using a first cleaning liquid W1 (see FIG. 3) and a second cleaning liquid W2 (see FIG. 4).

In performing process (S10), first, in process (S11), first cleaning liquid W1 is supplied to discharge surface 10*a* of the inkjet head.

Figure 3:
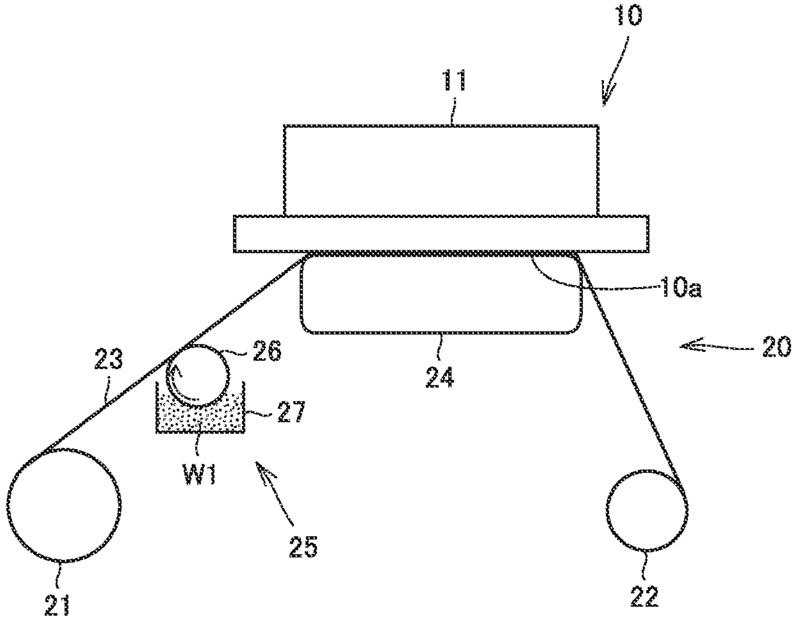
FIG. 3 is a schematic diagram illustrating a first cleaning portion constituting a cleaning portion of a cleaning device of the first embodiment.

FIG. 3 is a schematic view illustrating a first cleaning portion constituting a cleaning portion of an inkjet head device of the first embodiment.

As illustrated in FIG. 3, a first cleaning portion 20 of the cleaning device may be a web type cleaning unit. In this case, first cleaning portion 20 includes an unwinding roller 21, a winding roller 22, a web 23 made of band-shaped fabric, a pressing member 24, and a first supply portion 25.

Web 23 is previously wound around unwinding roller 21. Web 23 is bridged between unwinding roller 21 and winding roller 22 through between pressing member 24 and discharge surface 10*a*.

First supply portion 25 includes a supply roller 26 and a storage tank 27. Storage tank 27 stores first cleaning liquid W1. Supply roller 26 pumps up first cleaning liquid W1 stored in storage tank 27 and supplies first cleaning liquid W1 to web 23.

When winding roller 22 rotates to wind up web 23, web 23 moves from unwinding roller 21 toward winding roller 22. At this point, web 23 moves while being in contact with discharge surface 10*a* in a state where first cleaning liquid W1 is supplied by supply roller 26. Thus, first cleaning liquid W1 is supplied to discharge surface 10*a* of inkjet head 10. Furthermore, when web 23 is pressed toward discharge surface 10*a* by pressing member 24, the state in which web 23 abuts on discharge surface 10*a* can be maintained.

As first cleaning liquid W1, it is preferable to use a solvent capable of maintaining a dispersion state of the ink. For example, the same solvent as the ink solvent can be adopted as such the solvent.

When a UV curable ink containing a vinyl ether compound, a (meth) acryloyl group-containing compound, and a photoacid generator as a photopolymerization initiator is used, a cleaning liquid (solvent) containing a vinyl ether compound and a (meth) acryloyl group-containing compound is preferable as the ink. More specifically, first cleaning liquid W1 preferably contains the vinyl ether compound and the (meth) acryloyl group-containing compound that are the same as or similar to the ink.

First cleaning liquid W1 supplied to discharge surface 10*a* infiltrates discharge port 10*h* provided on discharge surface 10*a*. At this point, the dispersion state of the ink can be maintained using the above cleaning liquid as first cleaning liquid W1. When the ink is thickened or when pigment is aggregated, first cleaning liquid W1 can eliminate the thickening of the ink and/or the aggregation of the pigment.

Subsequently, as illustrated in FIG. 2, in process (S12), second cleaning liquid W2 is supplied to discharge surface 10*a* of inkjet head 10.

Figure 4:
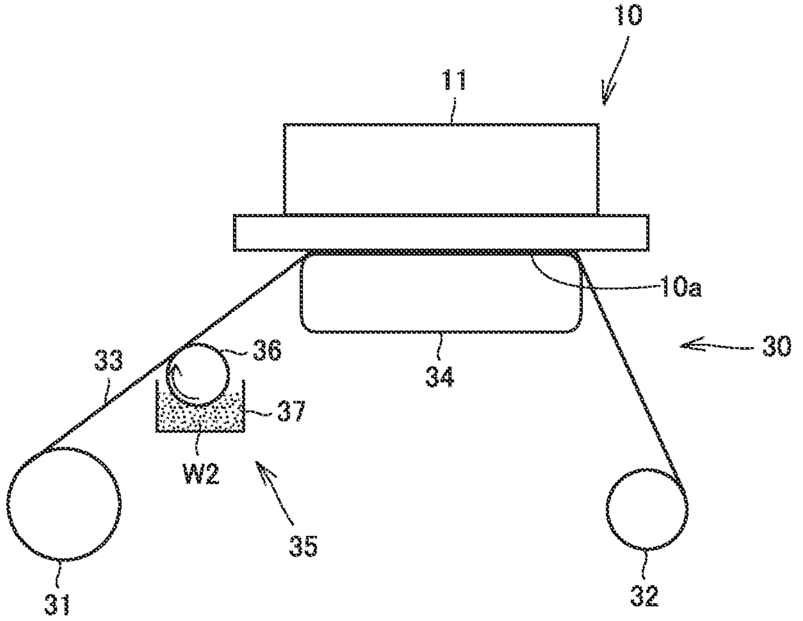
FIG. 4 is a schematic diagram illustrating a second cleaning portion constituting the cleaning portion of the cleaning device of the first embodiment.

FIG. 4 is a schematic diagram illustrating a second cleaning portion constituting the cleaning portion of the inkjet head device of the first embodiment.

As illustrated in FIG. 4, a second cleaning portion 30 of the cleaning device may be a web type cleaning unit. In this case, second cleaning portion 30 includes an unwinding roller 31, a winding roller 32, a web 33 made of belt-shaped fabric, a pressing member 34, and a second supply portion 35.

Web 33 is previously wound around unwinding roller 21. Web 33 is bridged between unwinding roller 21 and winding roller 32 through between pressing member 34 and discharge surface 10*a*.

Second supply portion 35 includes a supply roller 36 and a storage tank 37. Storage tank 37 stores second cleaning liquid W2. Supply roller 36 pumps up second cleaning liquid W2 stored in storage tank 37 and supplies second cleaning liquid W2 to web 33.

When winding roller 32 rotates to wind up web 33, web 33 moves from unwinding roller 31 toward winding roller 32. At this point, web 33 moves while being in contact with discharge surface 10*a* in the state where second cleaning liquid W2 is supplied by supply roller 36. Thus, second cleaning liquid W2 is supplied to discharge surface 10*a* of inkjet head 10. Furthermore, when web 33 is pressed toward discharge surface 10*a* by pressing member 34, the state in which web 33 abuts on discharge surface 10*a* can be maintained.

Water can be used as second cleaning liquid W2. Pure water such as ion-exchanged water, limiting filtered water, reverse osmosis water, and distilled water, or ultrapure water can be used as the water. Water sterilized by ultraviolet irradiation, addition of hydrogen peroxide, or the like may be used.

Second cleaning liquid W2 supplied to discharge surface 10*a* infiltrates discharge port 10*h* provided on discharge surface 10*a*. At this point, water-soluble foreign matter F can be dissolved using the above water as second cleaning liquid W2.

Subsequently, as illustrated in FIG. 2, second cleaning liquid remaining on discharge surface 10*a* of inkjet head 10 is removed in process (S20). Remaining second cleaning liquid W2 may contain part of first cleaning liquid W1.

Second cleaning portion 30 may be provided to be switchable between a supply state in which supply roller 36 abuts on web 33 to supply second cleaning liquid W2 to web 33 and a non-supply state in which supply roller 36 is separated from web 33 not to be able to supply second cleaning liquid W2 to web 33. In this case, in the non-supply state, web 33 to which second cleaning liquid W2 is not supplied is slid on discharge surface 10*a*, so that the cleaning liquid remaining on discharge surface 10*a* can be removed.

In place of web 33, the second cleaning liquid remaining on discharge surface 10*a* may be removed by sliding an absorbent member, such as sponge, that can absorb the cleaning liquid on discharge surface 10*a*. Thus, it is possible to suppress the remaining second cleaning liquid can be prevented from infiltrating discharge port 10*h*.

Subsequently, as illustrated in FIG. 2, in process (S30), ink I is discharged from the inkjet head (more specifically, discharge port 10*h*). Specifically, ink I mixed with second cleaning liquid W2 is discharged from discharge port 10*h* by purging. Thus, discharge port 10*h* of inkjet head 10 is cleaned, and discharge port 10*h* is filled with ink I.

First cleaning portion 20 and second cleaning portion 30 described above are examples, and may be those illustrated in the following modifications.

Figure 5:
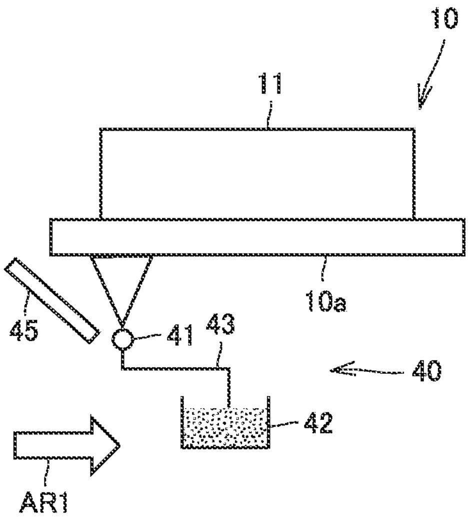
FIG. 5 is a schematic diagram illustrating a first modification of the first cleaning portion and/or the second cleaning portion.

FIG. 5 is a schematic diagram illustrating a first modification of the first cleaning portion and/or the second cleaning portion.

As illustrated in FIG. 5, first cleaning portion 20 and/or second cleaning portion 30 may be a nozzle type cleaning unit. The nozzle type cleaning unit includes a nozzle portion 41, a storage tank 42, a pipe 43, and a blade 45.

Nozzle portion 41 is disposed so as to be opposite to discharge surface 10*a*. Nozzle portion 41 is provided so as to be able to inject the cleaning liquid onto discharge surface 10*a*. Storage tank 42 stores the cleaning liquid (specifically, first cleaning liquid W1 or second cleaning liquid W2). Nozzle portion 41 is connected to pipe 43. An end of pipe 43 located on the side opposite to the side where nozzle portion 41 is located is located in the cleaning liquid stored in storage tank 42. Nozzle portion 41 injects the cleaning liquid conveyed by pipe 43 onto discharge surface 10*a*.

Nozzle portion 41 is provided to be movable along a plane direction (for example, an arrow AR1 direction in FIG. 5) of discharge surface 10*a* by a moving mechanism (not illustrated). The cleaning liquid is ejected while nozzle portion 41 moves, so that the cleaning liquid can be ejected to discharge surface 10*a* as a whole.

Blade 45 is also provided to be movable along the direction of arrow AR1 in FIG. 5 by the moving mechanism. The cleaning liquid ejected toward discharge surface 10*a* is scraped off with blade 45, so that the cleaning liquid supplied to discharge surface 10*a* can be made uniform in the plane.

The cleaning liquid may be supplied to the inkjet head by the nozzle type cleaning unit as described above. In particular, when second cleaning liquid W2 is used, because second cleaning liquid W2 is water, even when second cleaning liquid W2 is ejected from nozzle portion 41, the influence on the surroundings is small.

Figure 6:
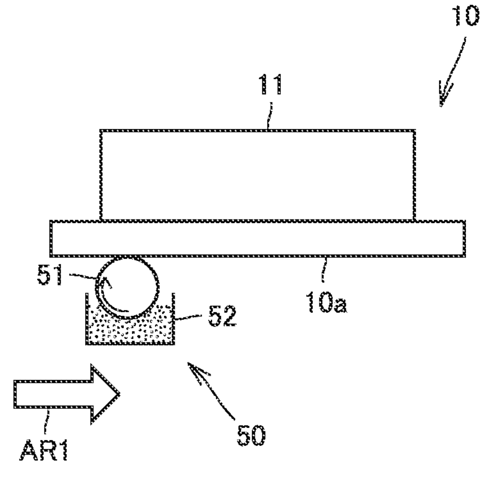
FIG. 6 is a schematic diagram illustrating a second modification of the first cleaning portion and/or the second cleaning portion.

FIG. 6 is a schematic diagram illustrating a second modification of the first cleaning portion and/or the second cleaning portion.

As illustrated in FIG. 6, first cleaning portion 20 and/or second cleaning portion 30 may be a roller type cleaning unit. The roller type cleaning unit includes a supply roller 51 and a storage tank 52. Supply roller 51 supplies the cleaning liquid (specifically, first cleaning liquid W1 or second cleaning liquid W2) stored in storage tank 52 to discharge surface 10*a* while rotating.

Supply roller 51 and storage tank 52 are provided to be movable along the plane direction (for example, arrow AR1 direction in FIG. 6) of discharge surface 10*a*. Supply roller 51 moves while being in contact with discharge surface 10*a*, so that supply roller 51 can entirely supply the cleaning liquid to discharge surface 10*a*.

Furthermore, in the above description, the case where the cleaning portion includes two cleaning portions (first cleaning portion 20 and second cleaning portion 30) has been exemplified. However, a single cleaning portion may be used as follows.

Figure 7:
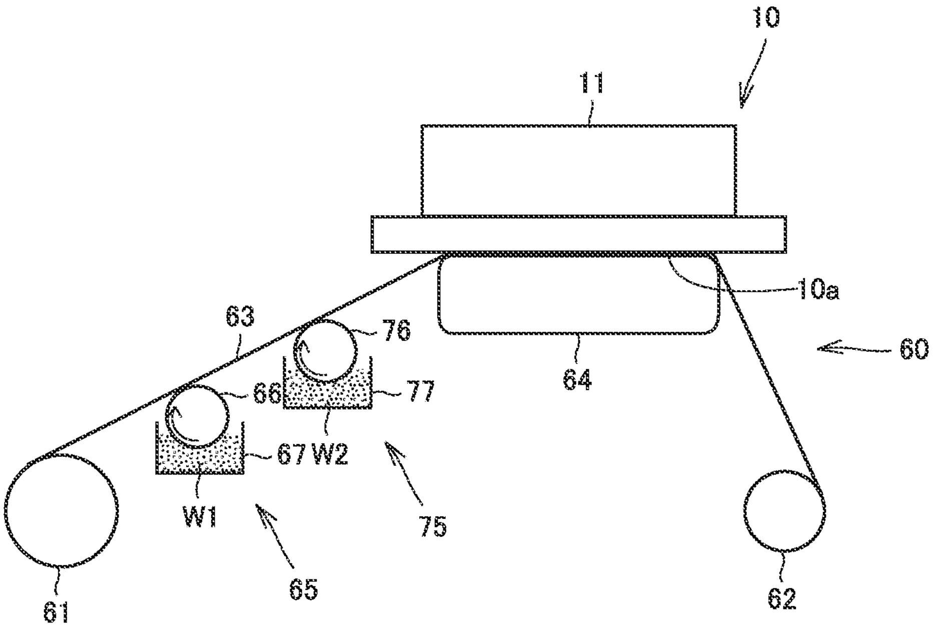
FIG. 7 is a view illustrating a modification of the cleaning portion.

FIG. 7 is a view illustrating a modification of the cleaning portion. In this case, a cleaning portion 60 includes an unwinding roller 61, a winding roller 62, a web 63 made of band-shaped fabric, a pressing member 64, a first supply portion 65, and a second supply portion 75.

Web 63 is previously wound around unwinding roller 61. Web 63 is bridged between unwinding roller 61 and winding roller 62 through between pressing member 64 and discharge surface 10*a*.

First supply portion 65 includes a supply roller 66 and a storage tank 67. Storage tank 67 stores first cleaning liquid W1. Supply roller 66 pumps up first cleaning liquid W1 stored in storage tank 67 and supplies first cleaning liquid W1 to web 63.

First supply portion 65 is provided to be switchable between the supply state in which supply roller 66 abuts on web 63 to supply first cleaning liquid W1 to web 63 and the non-supply state in which supply roller 66 is separated from web 63 not to be able to supply first cleaning liquid W1 to web 63. The supply state and the non-supply state of first supply portion 65 are switched by a controller of cleaning portion 60.

Second supply portion 75 includes a supply roller 76 and a storage tank 77. Storage tank 77 stores second cleaning liquid W2. Supply roller 76 pumps up second cleaning liquid W2 stored in storage tank 77 and supplies second cleaning liquid W2 to web 63. Second supply portion 75 is located on a downstream side of first supply portion 65 and on an upstream side of discharge surface 10*a* and pressing member 64 in the moving direction of web 63.

Second supply portion 75 is provided to be switchable between the supply state in which supply roller 76 abuts on web 63 to supply second cleaning liquid W2 to web 63 and the non-supply state in which supply roller 76 is separated from the web 63 not to be able to supply second cleaning liquid W2 to web 63.

First supply portion 65 and second supply portion 75 alternately supply first cleaning liquid W1 and second cleaning liquid W2 to web 63 by appropriately switching between the supply state and the non-supply state. For example, first supply portion 65 is in the supply state while web 63 moves toward winding roller 62, and second supply portion 75 is in the non-supply state while first cleaning liquid W1 is supplied to web 63.

After first cleaning liquid W1 is supplied to web 63 by first supply portion 65 for a predetermined period, first supply portion 65 is switched to the non-supply state. Thereafter, after web 63 of the portion to which first cleaning liquid W1 is supplied by first supply portion 65 passes through second supply portion 75, second supply portion 75 is brought into the supply state to supply second cleaning liquid W2 to web 63. Thus, first cleaning liquid W1 and second cleaning liquid W2 can be supplied to discharge surface 10*a* in this order.

In the above description, the case where first supply portion 65 is located on the upstream side of second supply portion 75 in the moving direction of web 63 has been described as an example. However, first supply portion may be located on the downstream side of second supply portion 75. In this case, first supply portion 65 is in the supply state, first cleaning liquid W1 is supplied to web 63, and second supply portion 75 is in the supply state so as to follow first cleaning liquid W1 supplied from first supply portion 65. Before second cleaning liquid W2 reaches first supply portion 65, first supply portion 65 is switched to the non-supply state. After second cleaning liquid W2 is supplied to web 63 for a predetermined period, second supply portion 75 is switched to the non-supply state. Thus, first cleaning liquid W1 and second cleaning liquid W2 can be supplied to discharge surface 10*a* in this order.

In the above description, foreign matter F is the water-soluble substance in which the component of ink I is precipitated. However, foreign matter F may be a substance in which ink I is thickened, an aggregate in which the pigment of ink I is aggregated, or a mixture of these and the water-soluble substance. The water-soluble foreign substance is not limited to those in which the component of ink I is precipitated, but may be another water-soluble foreign substance.

First cleaning liquid W1 is supplied to discharge surface 10*a* of inkjet head 10 like the first embodiment, so that the thickening of ink I and/or the aggregation of the pigment can be eliminated by first cleaning liquid W1. At this point, the generation of the aggregate can be prevented using a solvent capable of maintaining the dispersion state of ink I as first cleaning liquid W1. Second cleaning liquid W2 is supplied to discharge surface 10*a* of inkjet head 10, so that the water-soluble foreign matter can be dissolved.

Furthermore, second cleaning liquid W2 can be prevented from unnecessarily infiltrating discharge port 10*h* by removing second cleaning liquid W2 remaining on discharge surface 10*a*. In addition, after discharge surface 10*a* is cleaned with second cleaning liquid W2, ink I is discharged from discharge port 10*h*, second cleaning liquid W2 that infiltrates discharge port 10*h* is ejected to the outside, and the inside of discharge port 10*h* is filled with ink I, so that the dispersion state of ink I can be prevented from collapsing in inkjet head 10.

Second Embodiment

Figure 8:
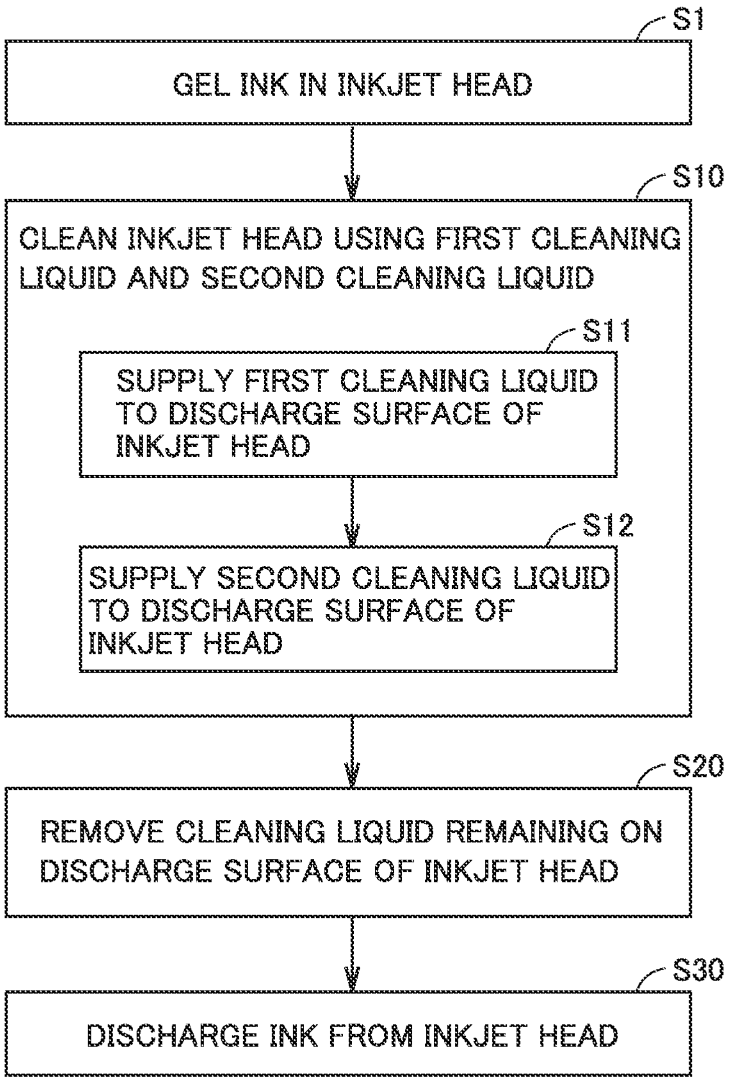
FIG. 8 is a flowchart illustrating a flow of a method for cleaning the inkjet head according to a second embodiment.

FIG. 8 is a flowchart illustrating a flow of a method for cleaning the inkjet head according to a second embodiment. With reference to FIG. 8, the method for cleaning the inkjet head of the second embodiment will be described. Also in the second embodiment, the case where foreign matter F is water-soluble is exemplified.

As illustrated in FIG. 8, the method for cleaning the inkjet head of the second embodiment is different from the method for cleaning the inkjet head of the first embodiment in that the method for cleaning the inkjet head of the second embodiment mainly includes a process (51) of gelling the ink in the inkjet. Other processes are substantially the same.

When the method for cleaning the inkjet head of the second embodiment is performed, first, at least ink I (see FIG. 9) located in discharge port 10*h* is gelled in process (51). Specifically, main body 11 is cooled using a cooler, and ink I in main body 11 is cooled less than or equal to a sol-gel transition point (solidification point). Ink containing wax can be suitably used as ink I. Foreign matter F exists inside gelled ink I.

Figure 9:
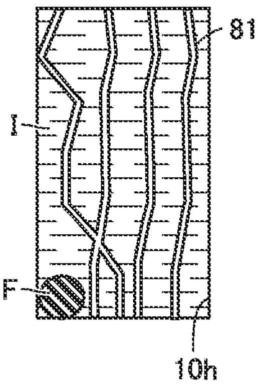
FIG. 9 is a view illustrating a state after a process of gelling ink in the inkjet in the flow of FIG. 8.

FIG. 9 is a view illustrating a state after the process of gelling ink in the inkjet in the flow of FIG. 8. As illustrated in FIG. 9, in the state after the process of gelling the ink in the inkjet, ink I is gelled, and a gap 81 is formed between gelled ink I. When at least ink I in discharge port 10*h* is gelled, the liquid such as water different from the solvent of the ink is less likely to enter discharge port 10*h*.

Subsequently, as illustrated in FIG. 8, in process (S10), inkjet head 10 is cleaned using first cleaning liquid W1 and second cleaning liquid W2. Specifically, in process (S11), first cleaning liquid W1 is supplied to discharge surface 10*a* of the inkjet head in substantially the same manner as the cleaning method of the first embodiment.

Figure 10:
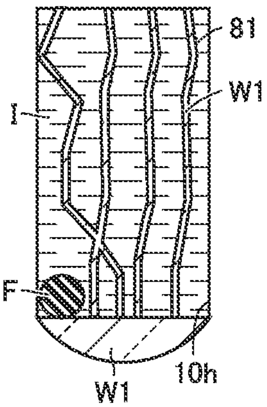
FIG. 10 is a view illustrating a state after a process of supplying a first cleaning liquid to a discharge surface of the inkjet head in the flow of FIG. 8.

FIG. 10 is a view illustrating the state after the process of supplying the first cleaning liquid to the discharge surface of the inkjet head in the flow of FIG. 8. As illustrated in FIG. 10, in the state after the process of supplying first cleaning liquid W1 to discharge surface 10*a* of inkjet head 10, gap 81 of gelled ink I is filled with first cleaning liquid W1.

Subsequently, as illustrated in FIG. 8, in process (S12), second cleaning liquid W2 is supplied to discharge surface 10*a* of inkjet head 10 in substantially the same manner as the cleaning method of the first embodiment.

Figure 11:
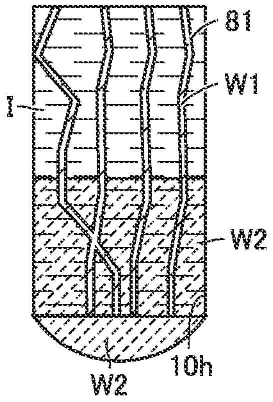
FIG. 11 is a view illustrating a state after a process of supplying a second cleaning liquid to the discharge surface of the inkjet head in the flow of FIG. 8.

FIG. 11 is a view illustrating the state after the process of supplying second cleaning liquid W2 to discharge surface 10*a* of inkjet head 10 in the flow of FIG. 8. As illustrated in FIG. 11, in the state after the process of supplying second cleaning liquid W2 to discharge surface 10*a* of inkjet head 10, part of second cleaning liquid W2 infiltrates discharge port 10*h*, and foreign matter F is dissolved in second cleaning liquid W2.

Subsequently, as illustrated in FIG. 8, in process (S20), second cleaning liquid W2 remaining on discharge surface 10*a* of inkjet head 10 is removed substantially in the same manner as in the first embodiment.

Figure 12:
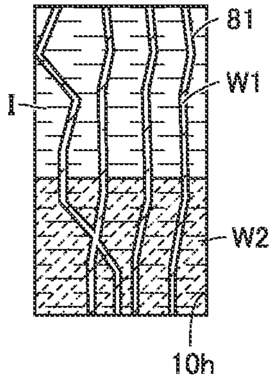
FIG. 12 is a view illustrating a state after a process of removing the second cleaning liquid remaining on the discharge surface of the inkjet head in the flow of FIG. 8.

FIG. 12 is a view illustrating the state after the process of removing the second cleaning liquid remaining on the discharge surface of the inkjet head in the flow of FIG. 8. As illustrated in FIG. 12, in the state after the process of removing second cleaning liquid W2 remaining on discharge surface 10*a* of inkjet head 10, second cleaning liquid W2 adhering to discharge surface 10*a* is removed, and second cleaning liquid W2 remains on the opening end side inside discharge port 10*h*.

Subsequently, as illustrated in FIG. 8, in process (S30), ink I is discharged from the inkjet head (more specifically, discharge port 10*h*). Specifically, main body 11 is heated using a heating device such as a heater to heat ink I in main body 11 more than or equal to the sol-gel transition point. Subsequently, ink I mixed with second cleaning liquid W2 is discharged from discharge port 10*h* by purging.

Figure 13:
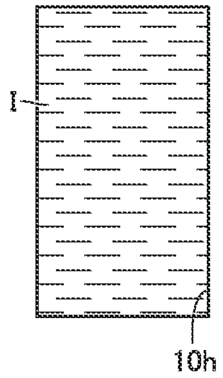
FIG. 13 is a view illustrating a state after a process of discharging the ink from the inkjet head in the flow of FIG. 8.

FIG. 13 is a view illustrating the state after the process of discharging the ink from the inkjet head in the flow of FIG. 8. As illustrated in FIG. 13, in the state after the process of ejecting ink I from inkjet head 10, discharge port 10*h* of inkjet head 10 is cleaned, and discharge port 10*h* is filled with ink I.

Even in the case of cleaning inkjet head 10 like the second embodiment, substantially the same effect as in the first embodiment can be obtained.

(Other Modifications)

In the first and second embodiments and the modifications described above, the case of cleaning single inkjet head 10 has been exemplified. Even in the case where a plurality of inkjet heads 10 are provided for each color, the cleaning method and the cleaning device of the first and second embodiments and the modifications can be applied. In this case, the cleaning portion may be switchable between a first cleaning mode in which inkjet head 10 is cleaned using first cleaning liquid W1 and second cleaning liquid W2 and a second cleaning mode in which inkjet head 10 is cleaned using only one of first cleaning liquid W1 and second cleaning liquid W2. The first cleaning mode and the second cleaning mode can be switched by the controller of the cleaning device. Furthermore, in this case, one of the plurality of inkjet heads 10 may be cleaned in the second cleaning mode.

Specifically, for example, in the inkjet head that handles the ink of a color in which water-soluble precipitate is likely to be precipitated and the thickening of the ink and the aggregation of the pigment are less likely to be generated, the cleaning may be performed using only the second cleaning liquid in the second cleaning mode. Furthermore, in the inkjet head that handles the ink of a color in which the water-soluble precipitate is hardly precipitated and the thickening of the ink and the aggregation of the pigment are easily generated, the cleaning may be performed using only the first cleaning liquid in the second cleaning mode. On the other hand, in the inkjet head that handles the ink of a color in which the water-soluble precipitate is likely to be precipitated and the thickening of the ink and the aggregation of the pigment are likely to be generated, the cleaning may be performed using the first cleaning liquid and the second cleaning liquid in the first cleaning mode.

Although embodiments of the present invention have been described and illustrated in detail, the disclosed embodiments are made for purposes of illustration and example only and not limitation. The scope of the present invention should be interpreted by terms of the appended claims.

What is claimed is:

1. A method for cleaning an inkjet head, comprising cleaning the inkjet head using a first cleaning liquid capable of maintaining a dispersion state of ink and a second cleaning liquid having a solvent different from the ink, wherein the step of cleaning includes supplying the first cleaning liquid onto a discharge surface in which a discharge port is provided and supplying the second cleaning liquid onto the discharge surface after the first cleaning liquid is supplied to the discharge surface.

2. The method for cleaning the inkjet head according to claim 1, wherein the first cleaning liquid is made of a solvent identical to the ink.

3. The method for cleaning the inkjet head according to claim 1, further comprising discharging the ink from the inkjet head after the supplying the second cleaning liquid to the discharge surface.

4. The method for cleaning the inkjet head according to claim 1, further comprising removing the second cleaning liquid remaining on the discharge surface after the supplying the second cleaning liquid to the discharge surface.

5. The method for cleaning the inkjet head according to claim 1, further comprising gelling at least the ink located in a discharge port of the inkjet head before the supplying the first cleaning liquid to the discharge surface, wherein ink containing wax is used as the ink.

6. The method for cleaning the inkjet head according to claim 1, wherein an ultraviolet curable ink is used as the ink, and water is used as the second cleaning liquid.

7. The method for cleaning the inkjet head according to claim 1, wherein the first cleaning liquid is supplied so that the first cleaning liquid infiltrates the discharge port from the discharge surface and the second cleaning liquid is supplied so that the second cleaning liquid infiltrates the discharge port from the discharge surface.

8. The method for cleaning the inkjet head according to claim 1, wherein the second cleaning liquid is supplied to the discharge surface using a web, and the step of removing is performed by sliding the web on the discharge surface when the second cleaning liquid is not supplied to the web.

9. A cleaning device cleaning an inkjet head, the cleaning device comprising a cleaning portion that cleans a discharge surface of the inkjet head in which a discharge port is provided, the cleaning device being configured to supply a first cleaning liquid capable of maintaining a dispersion state of ink onto the discharge surface and to supply a second cleaning liquid having a solvent different from the ink onto the discharge surface after the first cleaning liquid is supplied.

10. The cleaning device according to claim 9, wherein the cleaning portion includes a web that moves while being in contact with a discharge surface of the inkjet head, a first supply portion that supplies the first cleaning liquid to the web, and a second supply portion that supplies the second cleaning liquid to the web, and the first supply portion and the second supply portion alternately supply the first cleaning liquid and the second cleaning liquid.

11. The cleaning device according to claim 9, wherein the first cleaning portion and the second cleaning portion are any one of a web type cleaning unit, a roller type cleaning unit, and a nozzle type cleaning unit, the web type cleaning unit includes a web that moves while being in contact with the discharge surface and a first supply portion that supplies the first cleaning liquid to the web, the roller type cleaning unit includes a roller to which the first cleaning liquid is supplied and which moves while being in contact with the discharge surface, and the nozzle-type cleaning unit includes a nozzle portion that injects the second cleaning liquid toward the discharge surface and a blade that moves while being in contact with the discharge surface and scrapes off the second cleaning liquid adhered to the discharge surface.

12. The cleaning device according to claim 11, wherein the first cleaning portion is one of the web type cleaning unit and the roller type cleaning unit, and the second cleaning portion is the nozzle type cleaning unit.

13. The cleaning device according to claim 9, wherein a supply amount of the first cleaning liquid supplied to a discharge surface of the inkjet head is larger than a supply amount of the second cleaning liquid supplied to the discharge surface.

14. The cleaning device according to claim 9, wherein a plurality of the inkjet heads are provided for each color, the cleaning portion is switchable between a first cleaning mode in which the inkjet head is cleaned using the first cleaning liquid and the second cleaning liquid and a second cleaning mode in which the inkjet head is cleaned using only one of the first cleaning liquid and the second cleaning liquid, and any one of the plurality of inkjet heads is cleaned in the second cleaning mode.

* * * * *